US006973641B1

(12) United States Patent
Halstead

(10) Patent No.: US 6,973,641 B1
(45) Date of Patent: Dec. 6, 2005

(54) PERSISTENT REPRESENTATIONS FOR COMPLEX DATA STRUCTURES AS INTERPRETED PROGRAMS

(75) Inventor: Mark A. B. Halstead, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/090,119

(22) Filed: Jun. 4, 1998

(51) Int. Cl.[7] ............................................. G06F 9/44
(52) U.S. Cl. .................... 717/107; 345/440; 717/139; 715/500.1; 715/764
(58) Field of Search ................. 345/522, 440; 709/231, 328; 719/322, 328; 717/107, 139; 715/500.1, 764

(56) References Cited

U.S. PATENT DOCUMENTS

| 5,291,583 A | 3/1994 | Bapat .......................... 395/500 |
| 5,295,256 A | 3/1994 | Bapat .......................... 395/500 |
| 5,596,695 A | 1/1997 | Hamada et al. ............. 395/333 |
| 5,692,183 A | 11/1997 | Hapner et al. ............... 395/614 |
| 5,729,253 A | 3/1998 | Mashita et al. |
| 5,754,849 A * | 5/1998 | Dyer et al. ................... 395/612 |
| 5,784,553 A * | 7/1998 | Kolawa et al. ................ 714/38 |
| 5,793,972 A * | 8/1998 | Shane .......................... 709/219 |
| 5,862,372 A | 1/1999 | Morris et al. |
| 5,864,864 A | 1/1999 | Lerner |
| 5,864,866 A | 1/1999 | Henckel et al. |
| 5,889,520 A | 3/1999 | Glaser |
| 5,956,036 A | 9/1999 | Glaser et al. |
| 5,999,192 A | 12/1999 | Selfridge et al. |
| 6,014,134 A | 1/2000 | Bell et al. |
| 6,105,036 A * | 8/2000 | Henckel ....................... 707/104 |
| 6,157,933 A * | 12/2000 | Celi, Jr. et al. .............. 707/501 |

FOREIGN PATENT DOCUMENTS

| EP | 735465 A1 | 2/1996 | ............. G06F 9/44 |
| EP | 766185 A2 | 8/1996 | ........... G06F 17/30 |

OTHER PUBLICATIONS

Jaworski, "Java 1.1, Second Edition," Sams.net Publishing, pp. 734-737.*
Boll, S., et al., "A Java Application programming Interface to a Multimedia Enhanced Object-Oriented DBMS", *German National Center (online). First International Workshop on Persitence and Java (PJI).*, darmstadt.gmd.de, pp. 1-11, (Sep. 1996).
Cramer, T., et al., "Compiling Java Just in Time", *IEEE Micro, 17 (3)*, pp. 36-43, (May 1997).

(Continued)

*Primary Examiner*—Meng-Al T. An
*Assistant Examiner*—Van Nguyen
(74) *Attorney, Agent, or Firm*—Christensen O'Connor Johnson Kindness PLLC

(57) ABSTRACT

The structure of a complex data object such as a multimedia presentation is stored in a persistent representation comprising a directly executable program. The instructions of the program are created by translating recorded method calls on a function library when the object is created. The structure of the object is recreated during playback by executing the program instructions in a stack-based virtual machine in a user's computer. The persistent representation thus stores the structure as a series of operations for building the object, rather than as a static plan of the structure itself.

21 Claims, 5 Drawing Sheets

OTHER PUBLICATIONS

Massari, A., et al., "Virgilio: a non-immersive VR system to browse multimedia databases", *IEEE Intern. Conf. on Multimedia computing and systems proceedings*, 573-580, (1997).

Morrisson, R., et al., "Can Java Persist?", *German National Center [online]. First International Workshop on Persistence and Java (PJI).*, Accessed on Oct. 6, 1999. Retrieved from the Internet: http:/www.dcs.gl.ac.uk, pp. 1-15, (Sep. 1996).

Moss, J.E., et al., "Approaches to Adding Persistence to Java", *German National Center [online]. First International Workshop on Persistence and Java (PJI).*, Retrieved from dcs.gl.ac.uk, pp. 1-5, (Sep. 1996).

O'Brien, P., "Java Data Management Using ObjectStore and PSE", *Sun Microsystems [online]*, Accessed on Oct. 7, 1999, retrieved from java.sun.com, pp. 1-14, Nov. 1996.

Saljoughy, A., "Object Persistence and Java", http://www.javaworld.com, pp. 1-9, (May 1997).

\* cited by examiner

PERSISTENT REPRESENTATIONS FOR COMPLEX DATA STRUCTURES AS INTERPRETED PROGRAMS

RELATIONSHIP TO OTHER APPLICATIONS

This application is related to U.S. Pat. No. 6,096,095.

BACKGROUND OF THE INVENTION

The present invention relates to electronic data processing, and more specifically concerns interpreting persistent representations of the structure of multiple-component data objects for multimedia presentations and other applications.

One of the fastest growing areas of computer applications involves the presentation of complex multimedia information. Traditional vehicles for delivering multimedia, such as television and motion pictures, present their content as a single, fixed stream of information having no internal structure. That is, the presentation is structurally a single object, a single file of information, an indivisible unit of data having no separable parts. More recently, computer-mediated presentations of data were divided into individual parts, such as animated sequences of images and music made by combining individual sampled sounds. Today, multimedia presentations of many different kinds are actually complex structures of elemental data objects that are combined on the fly during playback according to a representation of the interrelationship of the content objects. That is, the structure of the individual parts of a presentation are no longer hard-wired into the content itself, but form a separate entity that must be transmitted and/or stored along with the content in order to recreate the presentation.

At the same time that the internal form of conventional multimedia presentations is widening to include multiple data elements having an explicit structure that is recreated upon playback, the range of things encompassed by the term 'presentation' is also becoming much more extensive. For the present purposes, therefore, this term must be taken in its widest possible sense. Presentations include performances, renditions, and realizations of all kinds of data. A movie is a presentation; a World Wide Web page is a presentation; the result of a query on a computer database can be considered a presentation. Other forms of presentation include slide shows authored in programs such as Microsoft PowerPoint, and animated diagrams in documents, on desktops, and in user interfaces such as menu bars.

Conventional authoring programs construct structured presentations from component objects that include standard methods for manipulating them. Such methods include animation routines, playback routines, and so forth. The methods may take the form of calls to an application program interface (API), which is a library defining predefined data types and individually callable functions. The functions may or may not have arguments, and may or may not return a result. They are frequently stored in a dynamic link library (.dll) in a personal computer or other digital processor.

Building a presentation from individual components requires a mechanism for specifying how the components interrelate and how they perform when the presentation is recreated during playback. This runtime structure of a presentation is a storage mechanism that a program uses to represent information in memory while the presentation is running. Runtime structures are generally created declaratively through an API designed individually for that specific structure. A program that uses an API to create a runtime structure calls functions to create data objects. These objects then become arguments to other function calls and so on, until the data structure is completely defined.

When the program creating the presentation is closed, some of the information representing the structure is written to a disk file. The long-term format of a runtime structure, from which the presentation can be recreated, is called a 'persistent' representation. A program that later recreates the presentation for viewing, editing, or other uses requires some kind of persistent representation of the runtime structure.

The customary approach to persistent representations of runtime data structures involves writing out a stylized description of the structure. For example, if the data structure of a presentation resembles a hierarchy of objects each with one or more children, the file format typically describes each object as the information contained in it, followed by references to each of the object's children.

A significant problem with this approach occurs when a persistent representation is read back into a program for recreating the presentation. It is often a complex task to map the representation into a sequence of API calls that will build the data structure. That is, this type of representation describes the actual data structure itself adequately, but it does a poor job of describing how to build the structure. Conventional representations require time-consuming parsing and translation. The problem increases rapidly with increased complexity in the data structure; modern presentations tend to have greater and greater complexity.

A need therefore exists for an improved system of representing the structures of multimedia and similar multi-component presentations, and for methods of generating and using persistent representations with increased speed and with reduced computer memory and resources.

SUMMARY OF THE INVENTION

The present invention provides a new form of persistent representation for specifying the structure of a complex data presentation or other object so that it can be recreated easily and quickly. This new representation takes the form of a sequence of instruction codes for an interpreter running in the user's computer. Rather than specifying the structure explicitly, the instruction codes cause the interpreter to perform a sequence of method calls on a predefined set of objects in a library for building the structure dynamically. That is, the representation is a program that builds the structure directly, and does not need translation or parsing from a static plan of the structure. Merely referencing the representation is sufficient to reproduce the presentation. A simple virtual machine or other interpreter executes the representation as a program, with little memory, resources, or time overhead. The instructions in the program call methods in a library of predefined functions.

Although designed primarily for a restricted set of instructions, the interpreter includes facilities for more general operations as well. Efficient design of instruction codes can reduce the overall size of the program, making it faster to download over a communications link. Other features also enhance the basic invention. For example, a stack-based virtual machine uses little memory and resources, and incurs minimal start-up penalties in recreating the data object. The use of temporary variables causes the program of the persistent representation to run more efficiently.

DETAILED DESCRIPTION

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural and logical changes may be made without departing from the spirit and scope of the present invention. The following detailed description is therefore not to be taken in a limiting sense, and the scope of the present inventions is defined only by the appended claims.

Figure 1:
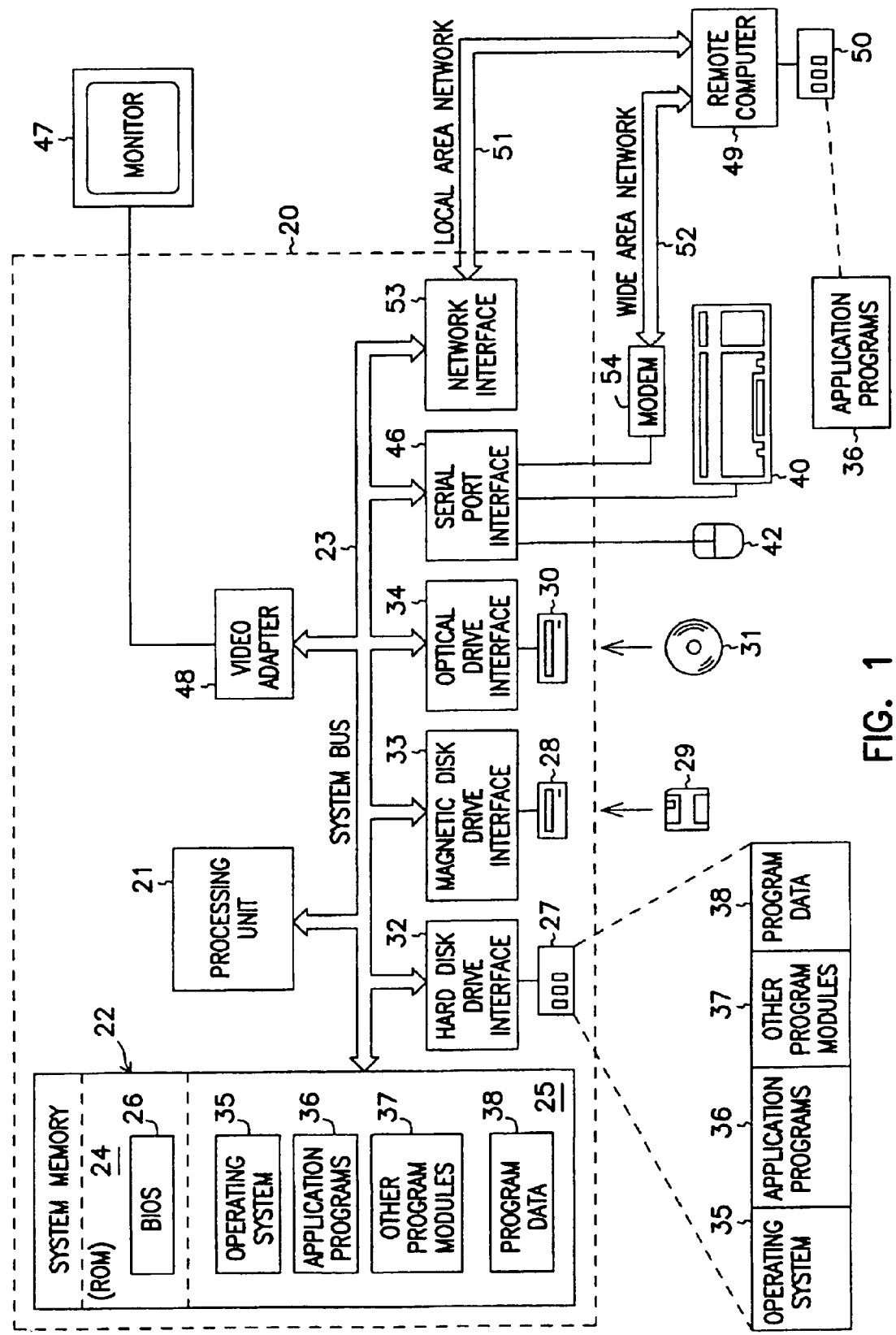
FIG. 1 is a block diagram of an environment suitable for practicing the present invention.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules depicted as residing within 20 or portions thereof may be stored in remote storage device 50. Of course, the network connections shown are illustrative, and other means of establishing a communications link between the computers may be substituted.

Figure 2:
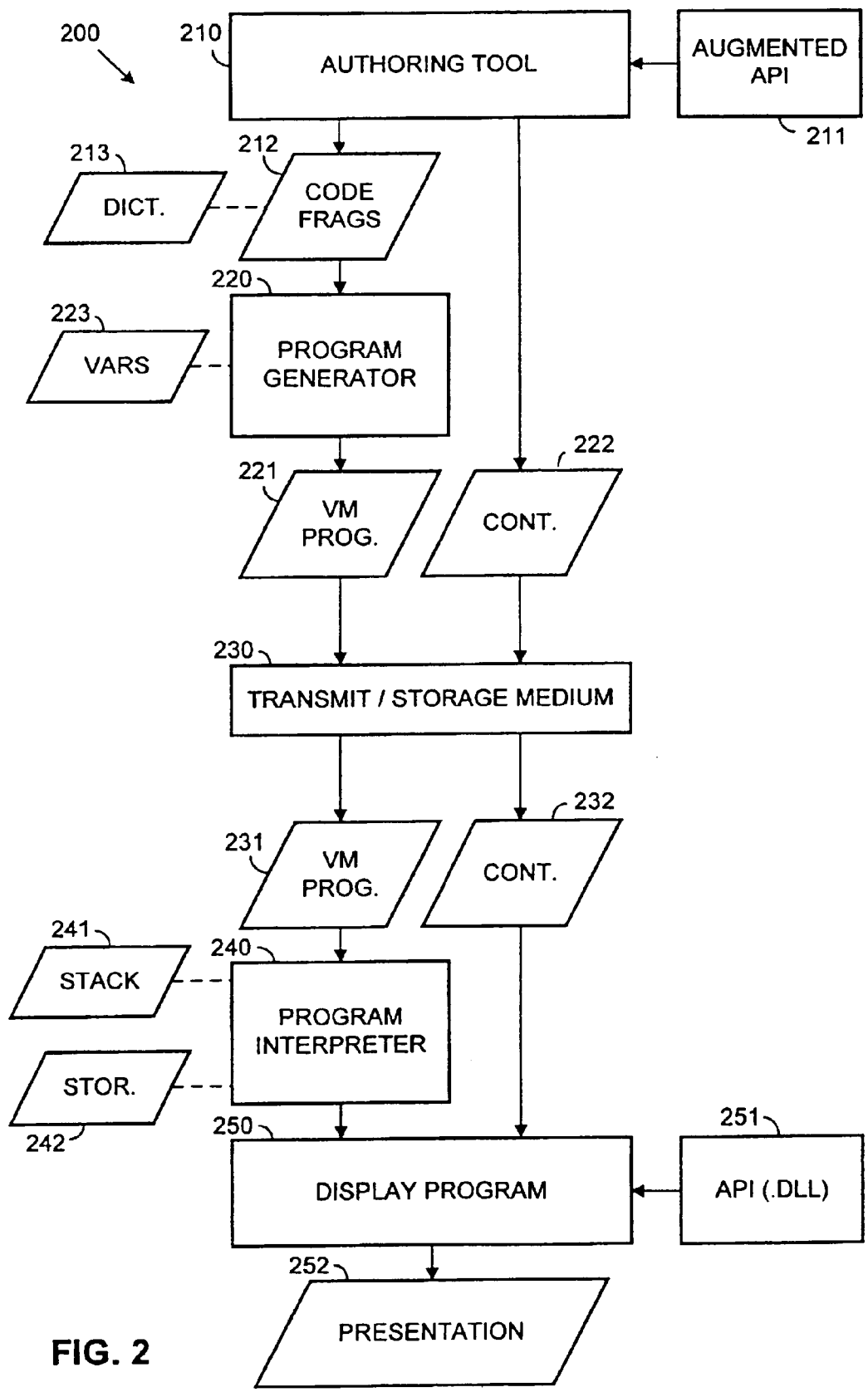
FIG. 2 is a block diagram showing the components of the invention.

FIG. 2 shows an overall system 200 for generating and interpreting a persistent representation according to the invention.

An author creates a data object such as a multimedia presentation with a conventional authoring tool 210 by manipulating images, sounds, text, and other content. For example, images can be animated, sound streams synchronized to the animation, and text inserted. When the designer manipulates on-screen controls to exercise these features, the authoring tool makes function or method calls to an application program interface (API). An API is a library containing program code for carrying out a predefined set of functions that are used sufficiently frequently to justify writing a single module that any other program can call with a simple mechanism. An API commonly takes the form of a dynamic link library (.dll) file defining a set of data types and a set of methods or functions for operating upon those data types. However, the invention does not require that they be stored in any particular way, or even that they be grouped together except in a conceptual manner; that is, the term 'library' merely means that the methods form a predefined set or group. Data types include basic types such as integers, strings, booleans. They also include objects that aggregate the basic types, called classes in Java and C++, and structs in C. Functions take any number (including zero) of arguments from the set of data types, and return zero or one result. For example, in Java, Void function1 (type1 a, type2 b) takes two arguments a and b of type1 and type2 respectively, and does not return a result. Type1 function2 ( ) takes no arguments, but returns result data having type 1. In this context, a presentation API (PAPI) contains a number of individual functions and data for performing operations such as scaling and rotating an image object by an amount specified in an argument, animating a series of images, and changing the volume of a sound object by a given amount. For example, to read an image from a file and set it rotating, the following set of API calls could be performed:

The invention adds information to a conventional API to form an augmented API 211. The additional information includes a readable form of the name of each function, whether or not it returns a result, and the number of arguments, if any. This information is easily created via type libraries for APIs based upon the publicly available Component Object Model (COM), and by reflection for APIs written in the Java language. The information can also include other information, such as a priority flag indicating whether or not the function has any side effects—that is, whether it affects the system other than by producing an explicit result. Most functions that do not return a result have side effects. Authoring tool 210 is modified if necessary to record each call as a code fragment representing each method called, the arguments to the method, and the order in which the authoring tool made that particular call. File 212 contains the entire sequence of code fragments, described in greater detail below.

Program generator 220 modifies, assembles, and translates the code fragments from file 212 to form a program 221 in a condensed file that embodies the persistent representation of the structure of the presentation created by the designer. That is, instead of explicitly specifying the actual structure of the presentation, program 221 represents the structure as a program containing a sequence of instructions for recreating that structure. This program is not (although it could be) written in the instruction set for an actual processor, but rather contains instructions executable by a virtual machine (VM) especially configured for this use.

A program describes a sequence of calls to the API functions. The arguments are either constant values or results from other functions. Result values can be stored in temporary variables 221 so they can be used as arguments in multiple functions. For example, a simple Java program might look like:
  int a=3;
  int b=function1 (a);
  int c=function2 (b, 4);
  function3 (c, function1 (c));

Program generator 220 must write out a functionally equivalent description of this call sequence in its designated output language. For example, if the target language is Java, the output might be:
Int x=Function2 (function1 (3), 4);
function3 (x, function1 (x));
If the target is a generalized stack-based virtual machine, the generator might output an equivalent program having the instructions:
  Push 4
  Push 3
  Call Function1
  Call Function2
  Store stack top to Temp0
  Call Function1
  Push Temp0 to stack
  Call Function3

This sequences assumes that a function pops its arguments off the stack and pushes its result to the top of the stack.

Block 230 symbolizes the transmission and/or storage of the presentation for playback, in any of a number of forms. If system components 210–223 are located on a personal computer 20, FIG. 1, program 221 and content 222 can be uploaded via network 51 or 52 to a server such as 49 for storage on device 50. The presentation might be incorporated into a World Wide Web page or other collection of data. Thereafter, a user at the same or another personal computer 20 can download program 221 and the presentation's content. Transmission might alternatively occur by distributing the content and the VM program 221 on a portable storage medium such as a diskette, CD-ROM, etc., or by storing it on a hard disk or other fixed medium.

Blocks 231 and 232 symbolize copies of program 221 and content 222 received and/or stored on the user's computer. A program interpreter 240 in this computer executes program copy 231, causing a conventional display program to execute the appropriate calls to API 251 for recreating presentation 252. Interpreter 240 is implemented as a virtual machine that executes a defined instruction set. It processes the instructions of program 231 so as to call from API 251 the same functions with the same arguments as those produced by authoring tool 210 for originally creating the presentation. API 251, however, is a conventional version of API 211; that is, it does not include the augmented information described above. In this way, display program 250 imbues the presentation content 232 with the structure encoded in the persistent representation of program 240 in a simple and direct manner. Interpreter 240 is typically a very small program that can be started with imperceptible initial delay, and that requires little memory and few resources in the user's computer. Also, of course, program 231 requires no parsing or conversion from a descriptive to an executable form.

Figure 3:
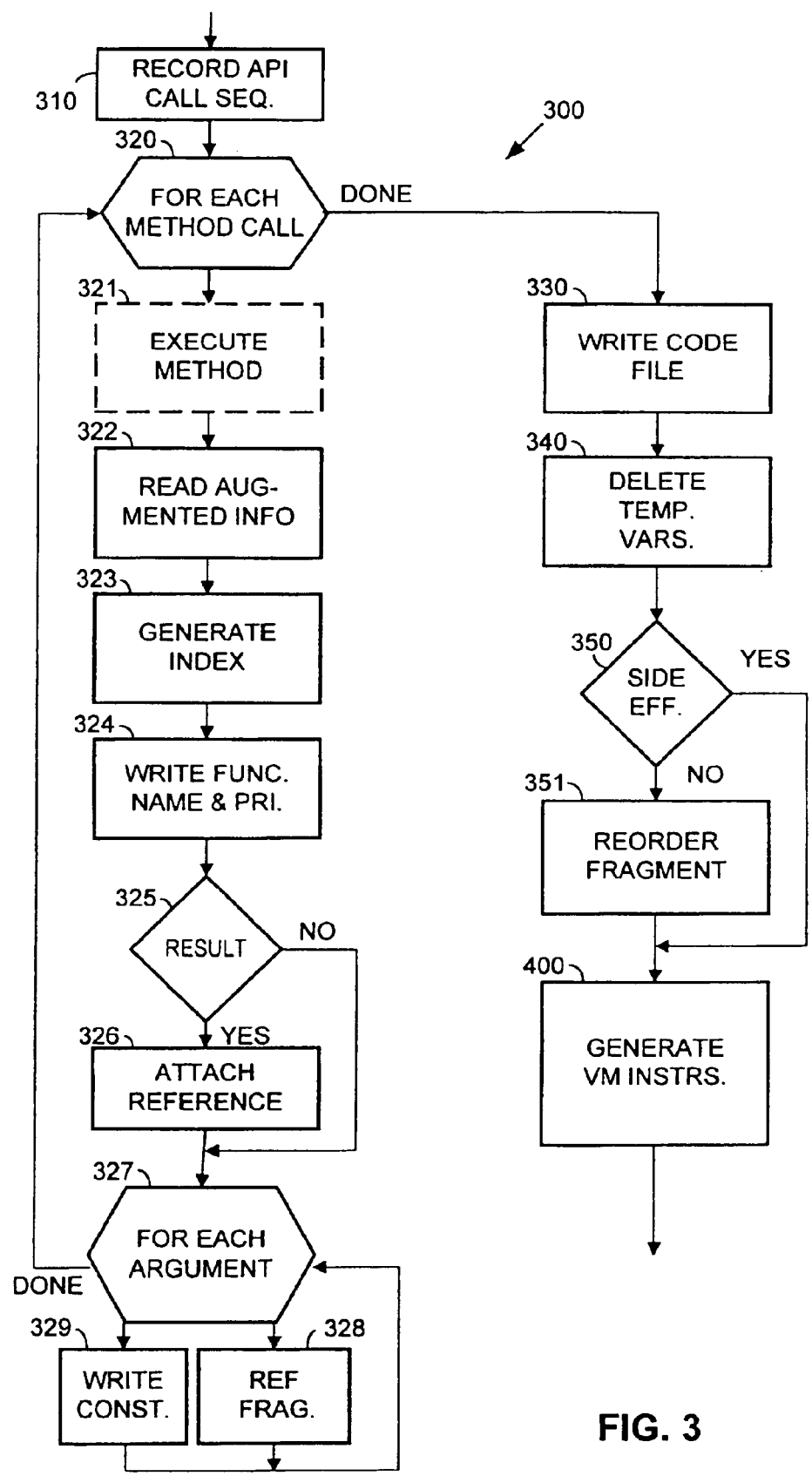
FIG. 3 is a flowchart of a method for generating a persistent representation for the invention.

FIG. 3 sets forth a method 300 for producing program 221. When the author has completed the presentation and wishes to publish it, block 310 records the sequence of method calls made by authoring tool 210 for the presentation. Block 320 executes steps 321–329 for each call to a method of augmented API 211, so as to produce a code fragment for that call.

Normally, a block such as 321 would execute the method of the API at this point However, because the present embodiment records the calls in a separate process after completion of the presentation's construction, the augmented API only pretends to call the conventional function; for this reason, block 321 is shown in dashed outline. To provide the actual functionality of the API at this point would consume extra memory. Therefore the augmented API only simulates the effect of calling the actual API, where it is being used only to record the call sequence. Block 322 reads the augmented information for the method from the API. This information includes the name of the function that the method has executed and a list of the arguments with which it was called. It also includes a priority flag denoting whether or not the function has side effects. In some situations, this characteristic can be inferred rather than made explicit with a flag; for example, almost every function that does not return a result has a side effect; alternatively, a table of functions in the appropriate block below could identify the names of those functions having side effects. Other ancillary data could also be included in the augmented information.

Block 323 generates a key representing the current code fragment; this can be a sequential number or any other unique designation. Block 324 writes the name of the function from the current call into the code fragment, and also records its priority flag. Subsequent method calls must be able to identify the source of each argument passed into them. Accordingly, if block 325 determines that the current function is one which produces an explicit result, then block 326 attaches a reference to the key of the current code fragment. The key can be placed in a dictionary 213, FIG. 2, of such objects, arranged by data value. Alternatively, the result data object itself could contain the key.

If the function has no arguments, block 327 returns immediately to block 320 for the next method call. For any argument that is the result of another function, block 328 inserts into an argument list a reference to the code fragment which had produced that result, by searching the dictionary of code fragments, using the argument as a key. The specific reference inserted into the current fragment is the key number of the appropriate fragment. If no fragment is found in the dictionary, the data value is assumed to be a constant. For any argument that is a constant, block 324 writes the constant into the argument list in the code fragment. Table I below illustrates a list of code fragments for the short example program set forth above.

TABLE I

| Key | Function Name | Argument List | Priority | Ref Cnt | Temp |
|---|---|---|---|---|---|
| 0 | Function1 | '3' | 0 | 1 | −1 |
| 1 | Function2 | Frag0, '4' | 0 | 2 | −1 |
| 2 | Function1 | Frag1 | 0 | 1 | −1 |
| 3 | Function3 | Frag1, Frag2 | 1 | 0 | −1 |

That is, the arguments are stored as references to constants of any type, or as references to other code fragments in the list. The columns labeled "Priority," "Ref Cnt," and "Temp" are explained later.

Block 330 outputs the list of all code fragments 212, FIG. 2. This list now describes all function calls that occur in the presentation and the arguments to those functions. Block 340 deletes all temporary variables that might have been created to hold arguments during the course of calling the augmented APIs. Blocks 350–351 reorders the fragments for greater efficiency, where possible. Reordering is limited, of course, by the availability of arguments from previous fragments. However, additional factors can limit reordering. Block 350 determines whether or not a particular code fragment has any side effects, any effects upon the system other than through returning an explicit result. Reordering such a fragment would have unpredictable consequences. Block 350 employs the priority flag written into each fragment in block 324. In the above table, fragments 0–2 have their flags off, and can be reordered in block 351. Fragment 3 has its flag on, and cannot be reordered. As mentioned, this or further flags can be used to control reordering for other reasons, or could even control other actions. Finally, block 400 generates instructions for the virtual-machine program 221, FIG. 2.

Figure 4:
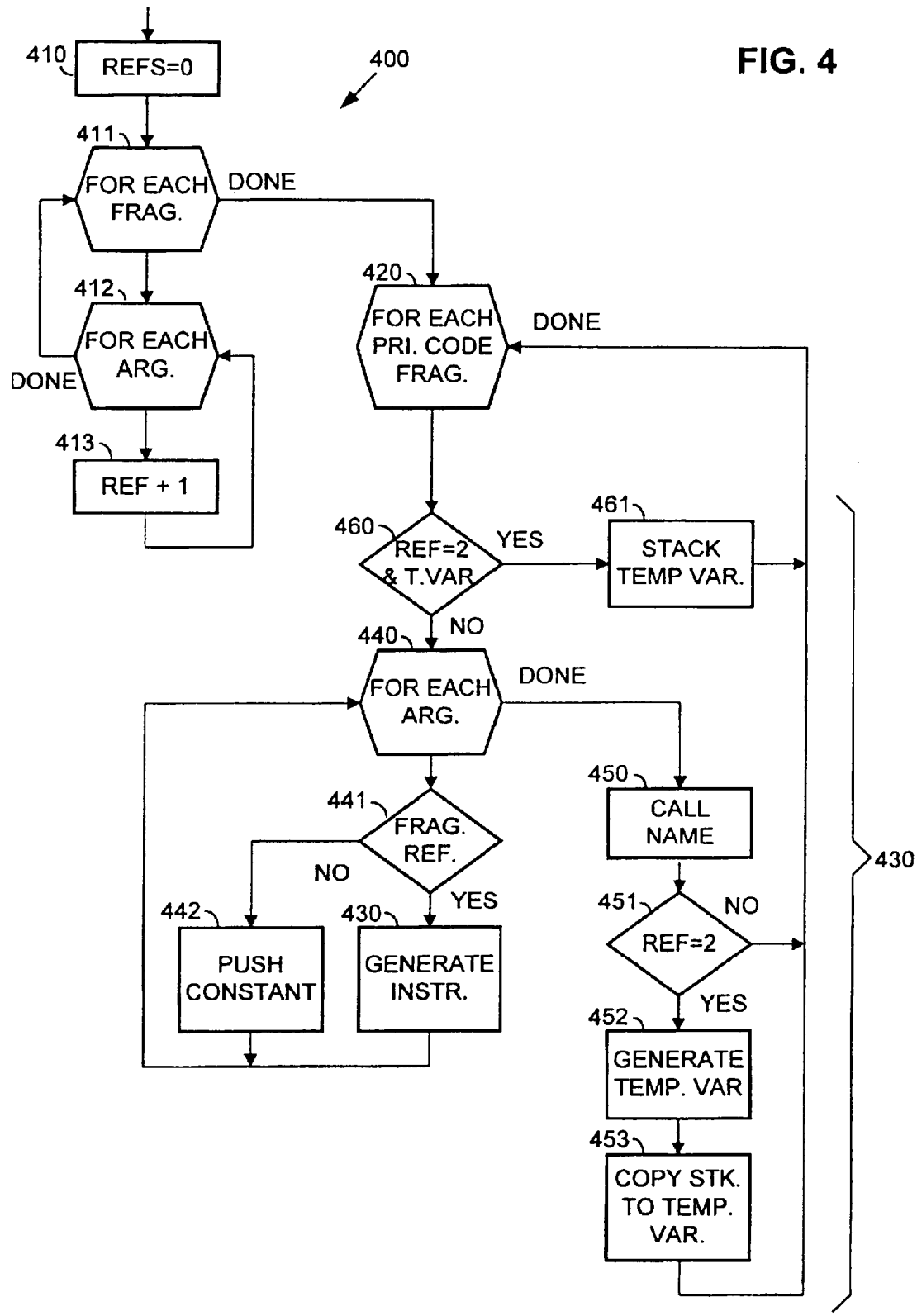
FIG. 4 is a flowchart detailing the code generation step of FIG. 3.

FIG. 4 details the steps of block 400. The specific form of block 400 depends upon the language chosen for its implementation and the type of virtual machine employed to interpret the language. The present embodiment employs a stack-based virtual machine. That is, its instruction stream is a last-in first-out stack 241, FIG. 2, whose instructions either call a function or push a constant value; a function that has arguments pops them off the top of the stack, and a function that returns a result pushes that result onto the top of the stack. In a simple form, block 400 writes instructions for pushing the arguments of a function onto a stack, and then writes an instruction that calls the function. In more detail, for each argument in reverse order, it determines whether the argument is a constant or a reference to another code fragment. A constant argument generates an instruction to push the constant data onto the stack of the virtual machine. For a code-fragment argument, the routine calls itself recursively, using the key of the referenced fragment to find the argument. This series of steps traverses a tree equivalent to the list, generating instructions for each fragment in an order that is compatible with the target virtual machine. However, this basic approach is inefficient in that it makes multiple visits to a fragment that is used as a function argument more than once. Multiple visits generate duplicate instructions for the same code fragment.

The method chosen for block 400 eliminates redundant code by employing two traversals, producing reference counts during the first, and generating instructions only during the second pass. First, block 410 sets the reference counts of all fragments in the code-fragment list to zero. These reference counts may be kept in any convenient location; Table I above shows them stored in the code-fragment list 212, in the column labeled "Ref Cnt." Block 411 performs the first pass, steps 412–413, for each code fragment. Block 412 examines each argument of a code fragment, and block 413 increments the reference count of each code fragment used as an argument in the current fragment. The values in the "Ref Cnt" column of TABLE I show the reference counts for each code fragment after a first pass through the example list. The maximum count is limited to two, because routine 400 only needs to detect whether or not a fragment is used multiple times. It is also possible to keep a true reference count, and to employ them to free up temporary variables for reuse after all references to them have been finished.

Block 420 performs the second pass. The blocks grouped together as 430 generate an instruction in the target language of the virtual machine 240, FIG. 2, for each code fragment. Because block 430 is called recursively in FIG. 4, block 420 need not iterate through all code fragments separately in order to generate the code for all fragments. Therefore, block 420 only processes fragments whose priority flags are set. These are the ones that do not return values for possible use by other fragments, and that have side effects. In the example shown in TABLE I, block 420 would loop only on Fragment 3. The remaining fragments are generated through recursion on the parameters of Fragment 3. This approach has the further effect of implicitly reordering the fragments according to block 351, FIG. 3.

Block 440 iterates through each argument within the current code fragment. If block 441 detects that the current argument is a constant, then block 432 generates an instruction that pushes the constant onto the stack. If the argument is a function (i.e., a reference to another fragment), then blocks 430 execute recursively to generate an instruction for the referenced fragment, for any fragments that the referenced fragment might reference, and so on.

When all arguments of the current fragment have been processed, block 450 appends an instruction to the instruction stream that calls the function named in the current fragment. In TABLE I, this is the entry in the "Function Name" column, the name that had been derived ultimately from a name in the augmented API 211, FIG. 2. Methods written in an object-oriented programming language usually also require pushing the object for which the method is being called, because a stack-based virtual machine must know what object to call the function on, and expects to find this object on the top of the stack. For example, a call to image.transform(arguments) involves generating code that evaluates the arguments to transform onto the stack, then generating code that evaluates the image object onto the stack, and finally outputting the instruction that calls the function. Placing the object on the stack may employ other function calls. Static methods are not defined on objects, and thus do not require pushing an object onto the stack. Technically, the object for which a method is called is also an argument of the method; however, the term "argument" herein does not include such an object, unless explicitly stated otherwise. Java and C++ commonly refer to this extra argument as the implicit "this" object.

If the reference count of the current fragment is less than two, block 451 exits blocks 430. But, if the reference count indicates that the current fragment is used as an argument two (or more) times, then block 452 generates a temporary variable representing that fragment. Block 453 generates an instruction that copies the top entry of the output stack, representing the function call made in block 450, to the new temporary variable. As an implementation detail, TABLE I has another column, "Temp," whose value is set to −1 when no temporary variable has been allocated for a fragment. Upon the first visit to a fragment, if RefCnt=2 and Temp=−1, then Temp is set to point to the next available temporary variable.

If the current fragment has a reference count of two, and it already has a temporary variable generated by block 452 from processing a previous fragment, then blocks 430 need not be executed again. Rather, block 460 causes block 461 to find the temporary variable associated with the current fragment and to generate an instruction to push a copy of it onto the stack. The temporary variable itself is not destroyed at this point; it might be used again by yet another code fragment.

When block 420 has finished processing all fragments, virtual-machine program 212, FIG. 2, contains a sequence of instructions constituting a program that is directly executable by the virtual machine of interpreter 240 for recreating the original presentation. That is, the program is the persistent representation of the structure of the original presentation; it describes the structure operatively rather than statically. Although method 400 outputs a program for a stack-based machine, methods for converting code fragments 212 into programs 221 for other types of interpreters 240, either virtual or real, could be designed in a straightforward manner from the above description.

The individual instructions in the output program correspond to calls to a predefined set of methods in API 211 or 251. Likewise, the types of the data items in the output program are all drawn from the data types supported by the same API. Rather than using the full names in the instructions, the function names and data types can be represented more compactly.

The methods are assigned to instruction codes comprising numeric IDs of one or two bytes; those methods expected to be called more often have the one-byte IDs. More specifically, the set of instruction codes is divided into n blocks of 255 codes each; n is chosen large enough to contain the entire set. The 256-n+1 most commonly used functions assigned one-byte codes numbered from 0 to 256-n. The remaining functions are assigned to two-byte codes. A first group of these have a first byte equal to 255, and a second byte in the range 0 to 255. The second group of 255 codes has a first byte of 254, and a second byte in the range 0 to 255, and so on.

For each data type that can have a persistent representation, an instruction code causes a value of that type to be pushed onto the stack. For instance, instructions "push integer value," "push floating-point value," and "push string value" are assigned to numeric IDs. For these instructions, the associated data item (integer, floating-point number, or string) is placed in the binary stream of the program directly after the instruction code. Additional instructions, described more fully below, pop data from the stack to a temporary storage, shown as block 242 in FIG. 2, and push it thence back to the stack. Integers are encoded with a 1- to 4-byte scheme. For unsigned integers, the two most significant bits of the first byte is one less than the number of bytes in the code. The remaining six bits are the most significant byte of the 1- to 4-byte integer; the following bytes, if any, are arranged form the most to the least significant values of the integer. Signed integers are encoded in the same manner, except that the constants 0X20, 0X2000, 0X200000, and 0X20000000 are subtracted from the 1- through 4-byte unsigned values, respectively, to give the final signed value.

Figure 5:
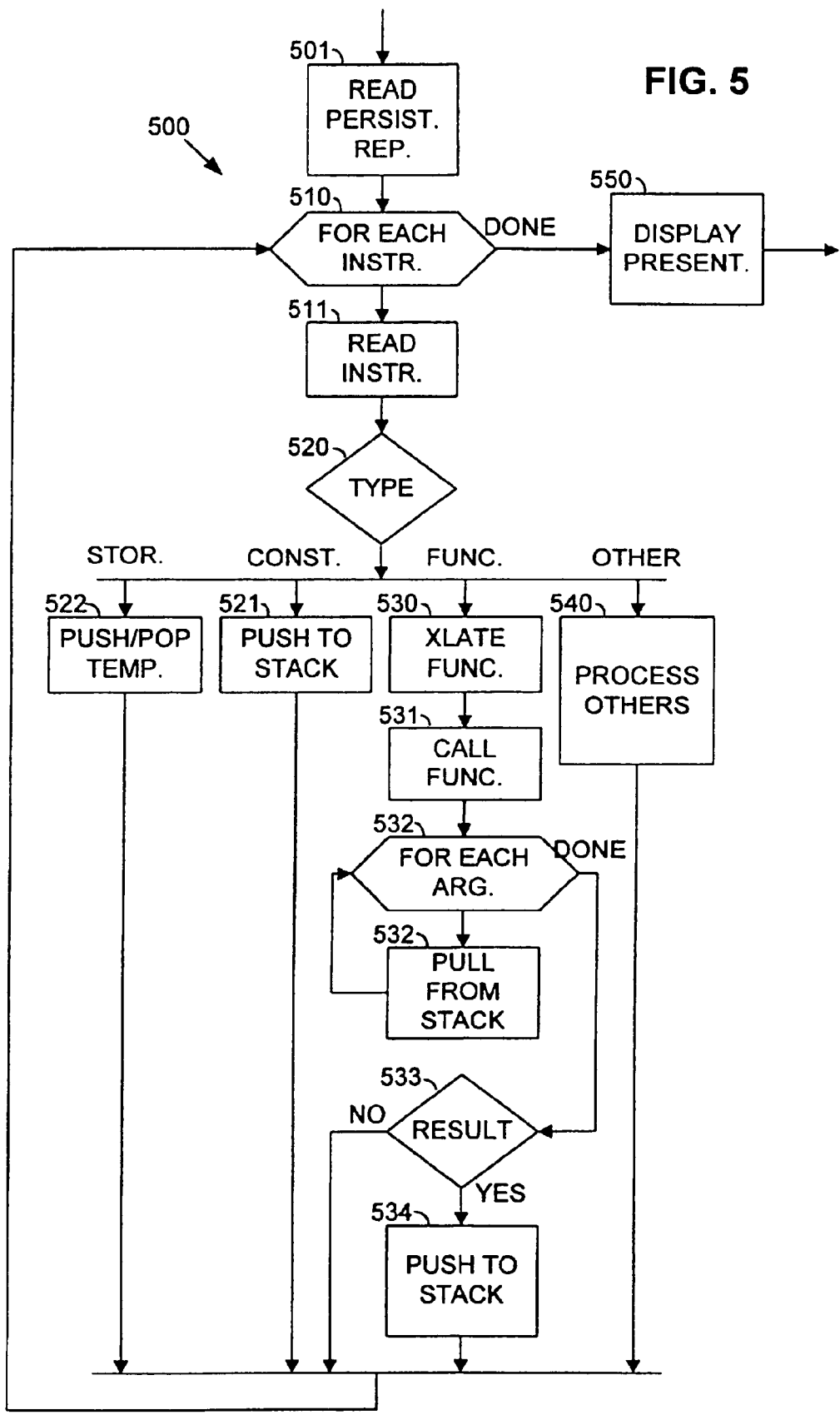
FIG. 5 is a flowchart of a method for interpreting a persistent representation according to the invention.

FIG. 5 shows a method 500 executed by the stack-based virtual-machine program interpreter 240, FIG. 2, for recreating the structure of the presentation 252 from the presentation content 232 and API 251. The present embodiment implements interpreter 240 as a part of a larger runtime program encompassing display program 250 and other modules as well. The interpreter is realized as a COM object created and maintained by a Microsoft ActiveX control that interfaces to a container such as the Microsoft Internet Explorer browser. This control manages the instantiation of any number of virtual machines for reading streams of instructions contained in files 231 stored both locally in and remotely from the computer that recreates or plays back the presentation.

Block 510 reads instructions sequentially from program copy 231, FIG. 2. Block 511 reads the current instruction from the data stream of program 231. Block 520 determines whether the current instruction represents a constant or a function call. If the former, block 521 pushes the constant onto a stack defined for the interpreter. Multiple stacks can be defined for different data types, if desired. Block 522 carries out a group of instructions that manipulate a temporary data storage area 242, FIG. 2, defined for the interpreter. This area includes a number of locations each having a unique key or address value. One instruction pops data from the stack to a temporary-storage location; another instruction pushes data from a storage location to the stack. Both instructions are followed by an integer in the instruction stream for specifying the key of a particular location in temporary storage.

If the current instruction is a function call, block 530 determines which API function the numeric ID in the instruction code specifies. Block 531 then calls the function from the API. If the function has arguments, block 532 causes block 532 to pull them one by one from the stack. If block 533 determines that the function returns a result value, block 534 pushes the result onto the stack.

Block 520 also includes a branch to block 540 for executing other kinds of instructions.

Although the set of possible functions is normally fixed, it is possible to define additional functions or methods. The description above implements methods in objects using the previously mentioned Component Object Model (COM). This model includes an "IDispatch" mechanism that enables the invocation of methods on objects that are not in the predefined set. For example, an invokeMethod call allows a named method or function on an IDispatch COM interface to be invoked with an array of arguments from values on the stack. Result values returned from IDispatch calls can be pushed onto the stack.

Additional instructions access COM objects defined elsewhere in a presentation, such as in a World Wide Web page. This allows the interpreter's instruction stream to call methods on these objects either via the normal mechanism or through the IDispatch interface.

Another special instruction allows the interpreter to define methods. A method in this case is a set of instruction codes that can be executed upon demand, such as at certain times or upon the detection of certain events. For example, display program 250 might issue a callback method when the user presses a mouse button, in order to display a string, show a new object, etc. When the interpreter encounters this instruction, it fetches the integer following the instruction code from the stream. This integer is a count of the bytes that make up the instructions and data for the method. The interpreter reads the appropriate number of bytes from the program stream into a buffer, and creates a new instance of the interpreter. The new interpreter reads and processes instructions from the buffer rather than from the original instruction stream. Arguments are passed to the method by placing them on the stack or in temporary storage before executing the method. Any result values are returned from the stack or from temporary storage.

Further instructions permit the interpreter to be queried for a particular named COM object. In this way, a COM object created by an instruction stream can be exported and used externally of the interpreter—for example, in a script.

The foregoing description permits a person having routine skill in the art to practice the invention, and will suggest to such a person variations within the scope of the invention as defined solely by the following claims.

What is claimed is:

1. A computer-implemented method for recreating a complex data object having a structure, the method comprising:
   recording a sequence of calls from an authoring tool to a set of predefined functions used to create a complex data object;
   translating the recorded sequence of calls into a sequence of directly executable instructions;
   storing the sequence of directly executable instructions as a persistent representation of the structure of the complex data object;
   obtaining the persistent representation of the structure of the complex data object and interpreting the directly executable instructions as calls to a set of predefined functions; and
   calling a predefined function corresponding to each directly executable instruction in the sequence of directly executable instructions to construct the complex data object directly from the persistent representation.

2. A method according to claim 1, further comprising displaying the complex data object to a user.

3. A method according to claim 1, wherein the complex data object is a multimedia presentation.

4. A method according to claim 1, wherein at least some of the functions have arguments.

5. A method according to claim 4, wherein a call to one of the functions includes a call to another function as an argument of the first function.

6. A method according to claim 4, wherein a call to one of the functions includes obtaining a constant value as its argument.

7. A method according to claim 1, wherein at least some of the functions return an explicit result.

8. A method according to claim 1, wherein the set of predefined functions further comprises information about the readable name of each function, whether each function returns a result, whether each function has a side effect, and the number of arguments for each function.

9. A method according to claim 8, wherein recording the sequence of calls further comprises obtaining the readable name of each function, whether each function returns a result, whether each function has a side effect, and the number of arguments for each function from the set of predefined functions.

10. A method according to claim 9, wherein the sequence of calls are recorded as a sequence of code fragments representing each function called, the arguments to each function, and the order in which the authoring tool made the call.

11. A method according to claim 1, wherein the sequence of directly executable instructions are interpreted by a stack-based virtual machine.

12. A computer-readable medium having computer-executable instructions for performing the method recited in claim 1.

13. A computer system having a processor, a memory, and an operating environment, the computer system being operable for performing the method recited in claim 1.

14. A system for recreating a complex data object from a persistent representation of its structure, the system comprising:
   an authoring tool for recording a sequence of calls to a predefined set of data types and methods for creating a complex data object;
   a program generator for translating the recorded sequence of calls into a sequence of directly executable instructions and storing the sequence of directly executable instructions as a persistent representation of the structure of the complex data object;
   a library having a predefined set of data types and methods for creating complex data objects; and
   a program interpreter for interpreting the contents of the persistent representation as a sequence of directly executable instructions, and for executing those instructions as a sequence of calls on the library so as to construct the complex data object directly from the persistent representation.

15. A system according to claim 14, where the complex data object is a multimedia presentation.

16. A system according to claim 14, where the program interpreter is a virtual machine located in a computer in which the complex data object is presented to the user.

17. A system according to claim 16, wherein the program interpreter is a stack-based virtual machine.

18. A system according to claim 17, wherein the stack-based virtual machine further includes a temporary storage array.

19. A system according to claim 14, wherein the predefined set of data types and methods further comprises information about the readable name of each method, whether each method returns a result, whether each method has a side effect, and the number of arguments for each method.

20. A system according to claim 19, wherein recording the sequence of calls further comprises obtaining the readable name of each method, whether each method returns a result, whether each method has a side effect, and the number of arguments for each method from the predefined set of data types and methods.

21. A system according to claim 20, wherein the sequence of calls are recorded as a sequence of code fragments representing each method called, the arguments to each method, and the order in which the authoring tool made the call.

* * * * *

UNITED STATES PATENT AND TRADEMARK OFFICE
CERTIFICATE OF CORRECTION

PATENT NO. : 6,973,641 B1  Page 1 of 1
APPLICATION NO. : 09/090119
DATED : December 6, 2005
INVENTOR(S) : Mark A. B. Halstead It is certified that error appears in the above-identified patent and that said Letters Patent is hereby corrected as shown below:

On the title page, in item (56), under "U.S. Patent Documents" in column 1, line 5, after "Mashita et al." insert -- 345/352 --.

On page 2, in item (56), under "Other Publications" in column 2, line 7, delete "Nov. 1996" and insert -- (Nov. 1996) --, therefor.

In column 3, line 1, delete "DRAWING" and insert -- DRAWINGS --, therefor.

In column 5, line 28, after "performed:" insert -- ImageBvr image = importImage ("image.gif"). transform (rotateRate (0.1)). An example of a set of APIs for reading in a sound, adjusting its volume, and panning it left to right over time is: SoundBvr sound = importSound ("sound.wav") .gain (0.75) .pan (sin(localTime)). --.

Signed and Sealed this

Fourth Day of August, 2009

JOHN DOLL
*Acting Director of the United States Patent and Trademark Office*